United States Patent Office 3,449,464
Patented June 10, 1969

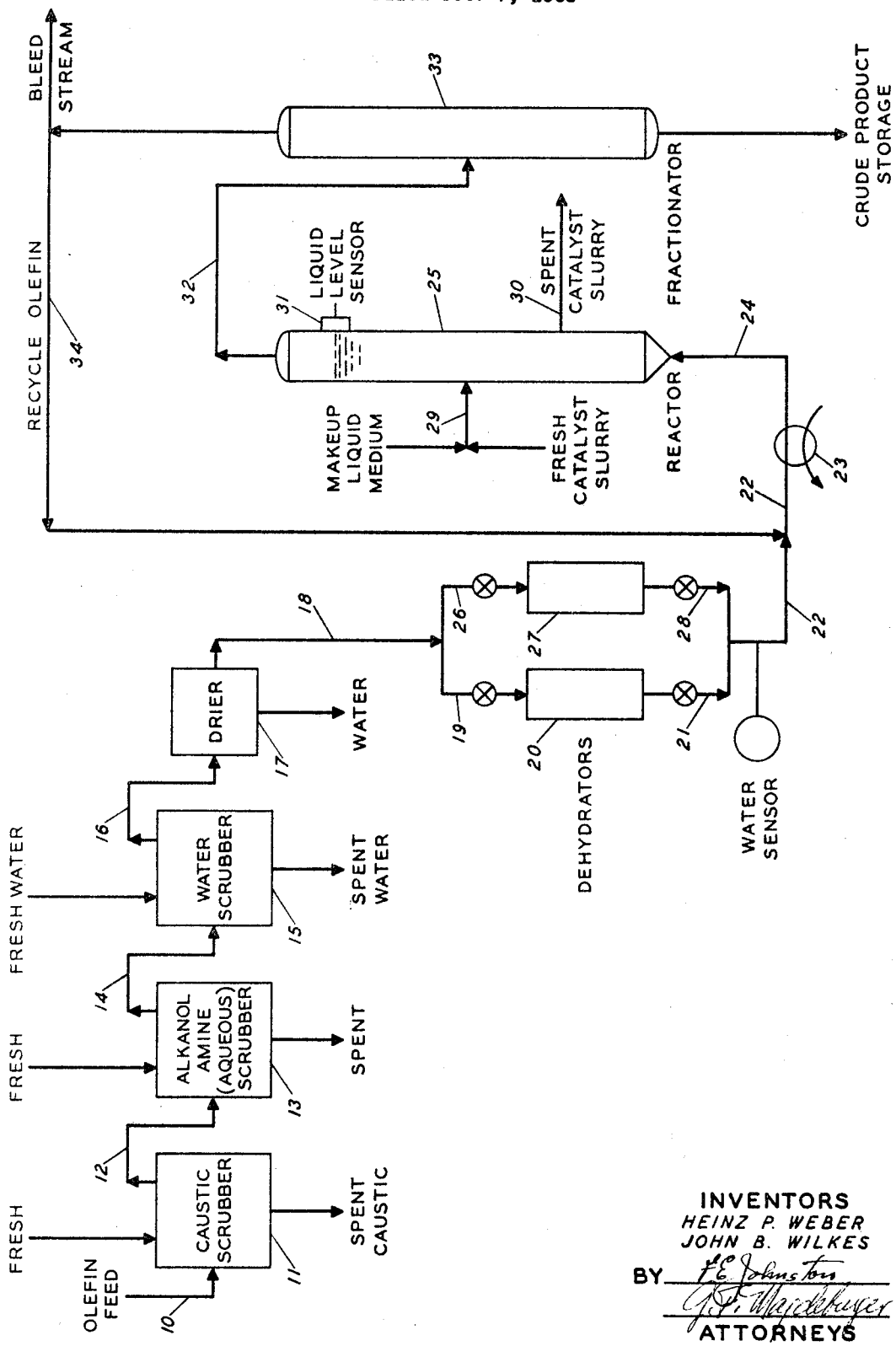

3,449,464
LIQUID PHASE HYDROCARBON OLIGOMERIZATION PROCESS
Heinz P. Weber, Berkeley, and John B. Wilkes, Albany, Calif., assignors to Chevron Research Company, a corporation of Delaware
Filed Oct. 7, 1963, Ser. No. 314,381
Int. Cl. C07c 3/10
U.S. Cl. 260—683.15                                      6 Claims

ABSTRACT OF THE DISCLOSURE

This invention relates to an improved continuous lower alkene hydrocarbon oligomerization process carried out in a liquid phase in which a finely divided alkali metal-containing catalyst is suspended in an inert liquid medium, the alkene feed contains less than 1 part by weight of water per million parts of feed, a cone-bottomed reactor is used, and the product removal from the reaction zone is via vaporization from the liquid reaction medium and vapor removal.

---

This invention relates to continuous hydrocarbon oligomerization processes catalyzed by alkali metal-containing materials. More particularly, it is concerned with condensations in a liquid phase of lower molecular weight hydrocarbons catalyzed by finely divided alkali metal-containing materials.

More specifically, this invention is directed to the combination of normally gaseous alkenes by dimerization and intercondensation reactions of olefinic and active hydrogen-containing olefinic hydrocarbons catalyzed by finely divided alkali metal-containing materials slurried in an inert liquid medium. It involves a critical correlation of process variables to accomplish the hydrocarbon building reactions in a continuous process, thereby greatly increasing the catalyst life and stabilizing the reaction system.

Alkali metal-containing hydrocarbon oligomerization catalysts, are, in general, extremely reactive materials and there is no known solvent for them permitting their use in solution. Either the material per se or the material supported upon inert solids is desirably used in a spread out form to provide as much catalyst surface as possible for the alkene contacting which is necessary for the production of oligomer. Either supported or dispersed per se, the most advantageous form for such catalyst is therefore in a very finely divided state as, for example, in the form of particulate matter having particles of less than 50 microns average diameter dispersed in an inert liquid medium. Extremely finely divided and slurried alkali metal-containing catalysts are, in general, much more effective as compared to the use of fixed bed alkali metal-containing catalysts and of the use of slurried macro-sized catalyst particles. Nevertheless, the extremely finely divided alkali metal-containing hydrocarbon oligomerization catalysts have been found in their use in continuous processes to suffer from erratic behavior without apparent reason. Among the more common manifestations of this behavior noted are such undesirable side reactions as (1) hydrogen transfer to give alkane and coke-like materials; (2) catalyst agglomeration; (3) tar formation; and (4) in particular, a meta-stable catalyst condition which appears to be responsive to relatively small thermal fluctuations leading, upon upset, to a rapid and exothermic destruction of the catalyst and the fouling of the reactor by solids formation. In general, the above-side reactions, in addition to the noted effects, result in the material reduction of catalyst half-lives.

No single variable appears to be responsible for alkali metal-containing hydrocarbon oligomerization catalyst failure and accelerated deactivation, but extremely small trace amounts of water and certain unfavorable process conditions have now been found to be in large part instrumental therein and appear to be cooperative in their effects. Relatively small amounts of water in the feed, which are far less than stoichiometric to the active catalyst species, appear to favor and catalyze the above undesirable side reactions. Similarly, trace amounts of carbonyl sulfide impurity likewise are believed to accelerate deactivation of alkali metal-containing hydrocarbon oligomerization catalysts.

It has now been found that lower molecular weight normally gaseous alkene hydrocarbons and active hydrogen-containing alkene hydrocarbons can be oligomerized by their contacting in the presence of extremely finely slurried alkali metal-containing catalysts in a continuous process with substantially improved catalyst lives and stabilized reaction conditions, provided the hydrocarbon feed to the process is maintained to have less than about 10 parts of water per million parts of feed. When the contacting is accomplished in a continuous process in an inert liquid slurry medium in the presence of a highly dispersed alkali metal-containing oligomerization catalyst under olefinic hydrocarbon oligomerization conditions, substantially improved catalyst lives and stabilized reaction conditions result in particular, provided that the hydrocarbon feed to the process is maintained to have less than about 10 parts of water per million parts of feed, while maintaining an ebullient agitated condition throughout the reaction liquid phase, and while keeping an overhead vapor phase in contact with the liquid reaction medium maintaining in the vapor phase a partial pressure of the resulting feed which is less than the liquification partial pressure of the feed and recovering the product by withdrawing vapor from the vapor zone during the continuous process. When the above conditions are concurrently satisfied, continuous hydrocarbon oligomerization reactions can be effected under hydrocarbon oligomerization reaction conditions and thereby result in substantially improved catalyst lives and reaction system stabilities.

Representative low molecular weight alkene oligomerization feeds include propene-ethene mixtures, propene, butenes, butene-ethene mixtures, pentenes, pentene-ethene mixtures, propene-butene mixtures, hexene-ethene mixtures and the like containing alkenes having less than 7 carbon atoms per molecule.

The accompanying process flow diagram, figure, is illustrative of a preferred embodiment of the present process.

Briefly, the process of the present invention comprises the continuous production of higher molecular weight alkene hydrocarbons from the catalyzed combination of lower alkenes and active hydrogen-containing alkene hydrocarbons in a reactor containing a liquid and vapor phase. Preferably in the process, the hydrocarbon feed compound having less than 1 part of water per million parts of feed is contacted in the presence of finely divided alkali metal-containing oligomerization catalyst. Preferably, the highly dispersed catalyst having a particle size less than 50 microns is dispersed in an inert liquid hydrocarbon which is maintained throughout the liquid phase in an ebullient, agitated condition. The resulting higher molecular weight olefinic hydrocarbon product is distributed under oligomerization conditions between the liquid phase where it is produced and the overhead vapor space of the reactor. Removal of vapor from the overhead phase prevents undesirable increase in the extent of the liquid volume and serves as a recovery means for the generated product. When hydrocarbon oligomerization reactions are effected in accordance with the present process, catalyst lives are markedly increased in general, frequently being as much as a tenfold improvement over those experienced from the use of the less favorable conventional methods known in the art. By strict adherence to the above conditions, catalyst half-lives of as much as 500 hours are generally enjoyed, during which period as much as 2000 kilograms of dimer (propene dimerization) are produced per kilogram of potassium used in the catalyst preparation. When, in particular, the water content of the hydrocarbon feed is maintained at a level of less than $1/10$ part per million parts of feed, indicated catalyst half-lives of as much as 1000 hours have been demonstrated and dimer production of the order of 4000 kilograms per kilogram of potassium. Under these conditions, catalyst cost is negligible, and catalyst regeneration and recovery steps are unnecessary.

By hydrocarbon oligomerization reactions is means the dimerization of alkene hydrocarbons, the combination of two dissimilar alkene hydrocarbon molecules and combinations of up to about 5 alkene hydrocarbon molecules which may be either the same or dissimilar hydrocarbon molecules. In every case a higher molecular weight olefinic hydrocarbon is produced. In order for the process to be effective in the preferred reaction system, it is necessary that the higher molecular weight alkene product be removed from the liquid phase reaction system as a vapor. For this reason, the resulting oligomer will, in general, have a molecular weight less than the molecular weight corresponding to about a $C_{12}$ olefinic hydrocarbon having the general formula $C_nH_n$ where $n$ may be in the range 5 to about 12.

By alkene hydrocarbon oligomerization conditions is meant in general:

(1) reaction temperatures in the range from about 105–180° C., preferably from about 115–160° C.;

(2) reaction zone pressures of the alkene feed monomer which are less than the liquification partial pressure of the feed at the reaction zone temperature;

(3) The use of an inert liquid diluent, preferably an inert liquid hydrocarbon diluent, having a boiling point at least about 10° C. higher than that of the resulting oligomer at the temperature and pressure chosen from the above range for the process; and (4) alkali metal-containing oligomerization catalyst materials having particle sizes in the range below about 50 microns, preferably having particle sizes in the range below about 20 microns.

By alkali metal-containing alkene hydrocarbon oligomerization catalyst materials is meant all those having extremely fine particle sizing as known in the art. In general, these materials correspond to the general formula:

$$MR_n$$

wherein M is an alkali metal, i.e., Mendelyeev Periodic Chart (H. D. Hubbard) Group I element having an atomic number greater than 3 and less than 56, including mixtures thereof, wherein $n$ is zero or one, and wherein R may be hydrogen, or a hydrocarbyl radical, including alkyl, aryl, aralkyl, alkenyl, and cycloalkyl radicals, preferably having less than 20 carbon atoms per radical group. In a preferred embodiment, potassium metal is dispersed to a particle size below 20 microns and converted to the active catalyst form by a short period of contact with ethylene, hydrogen or an active hydrogen-containing olefinic hydrocarbon, i.e., a hydrocarbon having at least 1 allylic hydrogen atom, such as propene, butene, pentene and the like. In addition, dispersing aids, including finely divided inert solids and organic compounds, such as oleic acid in minor amounts (less than stoichiometric with respect to the alkali metal) may be employed.

By inert liquid diluent is meant a diluent which is essentially chemically unreactive towards alkali metal-containing olefinic hydrocarbon oligomerization catalysts under oligomerization conditions. Saturated hydrocarbons are in general satisfactory inert media. Any hydrocarbon having a pKa less than that of propene is satisfactory.

In a preferred embodiment of the present invention, propene is dimerized in the presence of a slurried finely divided potassium-containing catalyst having a particle size generally below 20 microns. In accordance with the accompanying figure, 5 kg. per hour of propene feed is pretreated prior to introduction into the reactor. Thus, via line 10, propene, for example, a rectified $C_3$ propene-containing fraction from a petroleum refinery catalytic cracking product stream, is introduced into aqueous caustic scrubber vessel 11 containing, for example, sodium hydroxide in the concentration range 10–30%, by weight, and the resulting scrubbed propene is introduced via line 12 into scrubber vessel 13 containing a 10–30% aqueous diethanol-amine scrubbing solution or the equivalent. Through line 14 effluent propene from vessel 13 is passed into water scrubber 15 and thence through line 16 to drier 17.

Drier 17 is preferably a light hydrocarbon distillative drying unit or an equivalent unit capable of reducing the water content of the propene feed to at least about 10–30 parts per million parts by weight of feed. From drier 17 via line 18, the propene feed is passed into dehydrator 20, which is preferably about a 5 A. active molecular sieve adsorption bed unit or a liquid alkali metal gas scrubbing unit which is maintained at a temperature below incipient olefinic hydrocarbon oligomerization temperatures, usually below about 100° C. Other suitable but less desirable elements include calcium hydride adsorption units and the like, which preferably are capable of reducing the propene feed water content to less than 1 part per million parts of feed.

From drier 20 the propene is passed through lines 21 and 22 to heat exchanger 23, and in passing through line 22 is preferably monitored by a water sensor. Alternatively during regeneration of dehydrator 20, the flow of propene is via elements 26, 27 and 28.

By means of heat exhanger 23, the temperatures of the propene feed gas is adjusted such that in passing through line 24 it is delivered to reactor 25 at a temperature in the range 25–150° C., preferably in the range 115–140° C., thereby serving upon introduction into reactor 25 as an internal heat sink taking up in larger part the exothermic heat of reaction of the propene dimerization in attaining the preferred reaction temperature, i.e., in the range 115–160° C.

Reactor 25, scaled for purposes of illustration for the production of about 4.53 kg. of propene dimer per hour, is a cone-bottomed, 38 liter reactor fitted for basal admission of the propene feed, is jacketed for temperature control, is maintained at a total vapor pressure of about 41 atmospheres under reaction conditions, and is adapted for vapor phase withdrawal via line 32 of the resulting product.

Preparatory to start up, reactor 25 is charged via line 29 with slurried alkali metal-containing catalyst and additional inert medium as required, such that the reactor contains about 15.2 liters of inert liquid hydrocarbon, preferably aromatic hydrocarbon-free paraffinic hydrocarbon having a boiling point of at least 180° C. at 41 atm. pressure, about 35 gram mols of finely divided potassium metal and sufficient dispersion aids as known in the art to efficiently stabilize such a dispersion, for example, about 1.4 kg. of finely divided talc (1–10 micron size range) and about 55 grams of oleic acid.

By passing propene, as noted above, into reactor 25 charged with catalyst, also noted above, maintaining a reactor temperature of about 150° C., and a reactor pressure of about 41 atmospheres, partial conversion of the propene feed to dimer results with the unconverted propene and dimer product passing into the liquid-free overhead portion of the reactor. Via line 32 the vaporized product, unconverted feed and traces of higher boiling hydrocarbons are introduced into fractionator 33 wherein the unconverted propene is separated as a distillate fraction from the product stream and recycled via line 34 to feed line 22, and the crude propene dimer is recovered as a bottoms fraction containing trace amounts of the inert medium, which depletion of medium from the reactor from time to time is made up by addition via line 29 of make-up medium. Similarly, via line 30, spent catalyst slurry is removed, and via line 29, fresh catalyst slurry is added to maintain catalyst activity at the desired level. Item 31 is a liquid level sensor.

Using a 99+ percent propene feed having an estimated 0.05 p.p.m. of water impurity, and a catalyst having a particle sizing in the range below 50 microns, a catalyst half-life of 1000 hours has been demonstrated. A typical crude product composition is as follows:

| | Wt. percent |
|---|---|
| $C_3H_6$ | 2.0 |
| $C_5H_{10}$ | Traces |
| $C_6H_{12}$ | 96.0 |
| $C_9H_{18}$ | 0.6 |
| Medium | 1.0 | which yields, after a single simple distillation, essentially pure propene dimer.

When, however, propene dimerization is carried out as above described, except that the water content of the feed is only about 15–20 p.p.m., catalyst half-lives are only of the order of 25–50 hours. Catalysts subjected to such relatively large amounts of water are also sensitized such that as little as a transient 10° to 15° C. increase of temperature over the operating temperature may initiate an autocatalytic exothermic degradation of the catalyst which kills the catalyst and leaves the reactor badly fouled with carbonaceous solid. Improved catalyst half-lives and stabilities result when water contents of the feed are limited to the range 1.5–10 p.p.m., and half-lives may be as much as 100 hours.

On the other hand, when the water content was reduced to about 0.4 p.p.m., catalyst half-lives were found to rapidly improve with decreasing water content such that in the small change from 0.2 to 0.1 p.p.m., relative catalyst half-lives increased by about 275 hours. Further, decrease in water content below 0.1 to 0.05 p.p.m. is estimated to cause an increase in the half-life of about 400 hours. The amounts of water here considered are far less than stoichiometric with respect to the lost catalytic activity, and the data are believed to indicate that water in small amounts catalyzes the decomposition of extremely finely divided alkali metal-containing hydrocarbon oligomerization catalysts.

For satisfactory alkene hydrocarbon oligomerizations using very finely divided alkali metal containing catalysts, it is necessary that the liquid medium be maintained in an essentially ebullient condition throughout. Under analogous conditions, propene was dimerized in two experiments except that in Case I the reactor had a flat bottom, and in Case II, a cone-bottomed reactor was used. In each experiment the run was continued for 50–60 hours with the following result:

| Run | Catalyst half-life (estimated) hrs. |
|---|---|
| I | 85 |
| II | 430 |

Only a very small portion of the reactor volume of Case I was relatively quiescent (estimated as being in the range 0.1 to 1.0% of total liquid volumes). These data indicate (in addition to the use of feeds having less than about 10 p.p.m. of water) that for satisfactory catalyst half-lives, the liquid phase reaction medium must be maintained essentially throughout in an ebullient condition.

By active molecular sieve adsorption bed is meant, in general, dehydrated synthetic crystalline zeolite-type solids as known in the art having high affinity for molecular species of substantial polarity such as water, hydrogen sulfide, epoxides, carbonyl sulfide and the like. In general, these materials are variously ratio'd composites of silicon oxides, alumina oxides, alkaline earth metal oxides and alkali metal oxides. In particular, those sieve materials having pore diameters in the range below about 10 A. are preferred.

While one specific process embodying the present invention has been described in detail, it is to be understood that the description is illustrative only and for the purpose of making the invention more easily understood. It is not the intent that the invention is to be construed as limited to details of the description, except insofar as such have been included in the terms of the following claims.

We claim:
1. In the continuous oligomerization of propene in an inert liquid medium by the reaction of a propene feed catalyzed by a dispersed finely divided potassium-containing oligomerization catalyst under propene oligomerization conditions, the improvement which comprises:
   (a) maintaining the water content in said feed at less than 1 part of water per million parts of feed;
   (b) maintaining the temperature of said feed at a temperature in the range from about 25–150° C.;
   (c) basally introducing said feed into a cone-bottomed reaction zone containing an inert liquid hydrocarbon having dispersed therein said oligomerization catalyst, said zone having an overhead vapor zone wherein the vapor pressure of said propene is maintained at a pressure less than the liquification partial pressure for said propene under said oligomerization conditions, thereby maintaining said reaction medium essentially throughout in an ebullient condition; and
   (d) withdrawing vapor from said vapor zone thereby recovering the resulting propene oligomer.

2. The process of claim 1 wherein the water content is maintained by contacting said feed with a molecular sieve adsorption bed.

3. The process of claim 2 wherein prior to contacting said sieve bed, said feed is separately scrubbed by an aqueous caustic solution having a weight percent concentration of caustic in the range 10–30, and an aqueous alkanolamine solution containing a weight percent alkanolamine content in the range 10–30.

4. The process of claim 1 wherein said withdrawn vapor is fractionated, thereby separating said vapor into a bottoms fraction and an overhead fraction rich in propene, said overhead fraction being recycled to said reaction zone.

5. In the continuous oligomerization in an inert liquid medium of alkenes having less than 7 carbon atoms per molecule by their reaction catalyzed by a dispersed finely divided alkali metal-containing oligomerization catalyst under oligomerization conditions, said catalyst having a particle size less than about 50 microns, the improvement which comprises:
   (a) maintaining the water content of said alkenes at less than 1 part of water per million parts of said alkenes;

(b) maintaining the temperature of said alkenes at a temperature in the range from about 25–150° C.;

(c) basally introducing said alkenes into a cone-bottomed reaction zone containing an inert liquid hydrocarbon having dispersed therein said oligomerization catalyst, said zone having an overhead vapor zone wherein the vapor pressure of said alkenes is maintained at a pressure less than the liquification partial pressure for said alkenes under said oligomerization conditions, thereby maintaining said reaction medium essentially throughout in an ebullient condition; and (d) withdrawing vapor from said vapor zone thereby recovering the resulting alkene oligomer.

6. The process of claim 5 wherein said alkenes are n-butene and ethene.

References Cited

UNITED STATES PATENTS

| 2,970,177 | 1/1961 | Cobb. |
| 2,988,503 | 6/1961 | Milton et al. |

FOREIGN PATENTS

| 1,284,453 | 1/1962 | France. |
| 1,284,457 | 1/1962 | France. |
| 110,728 | 3/1961 | Pakistan. |

PAUL M. COUGHLAN, JR., *Primary Examiner.*